(12) United States Patent
Horne et al.

(10) Patent No.: US 6,810,562 B1
(45) Date of Patent: Nov. 2, 2004

(54) HINGE CONNECTION

(75) Inventors: David Horne, South Wonston (GB); John David Schnabel, Fareham (GB)

(73) Assignee: APW Electronics Ltd., Hampshire (GB)

( * ) Notice: Subject to any disclaimer, the term of this patent is extended or adjusted under 35 U.S.C. 154(b) by 0 days.

(21) Appl. No.: 09/889,685

(22) PCT Filed: Jan. 19, 1999

(86) PCT No.: PCT/GB00/00094

§ 371 (c)(1),
(2), (4) Date: Mar. 25, 2002

(87) PCT Pub. No.: WO00/44076

PCT Pub. Date: Jul. 27, 2000

(30) Foreign Application Priority Data

Jan. 19, 1999 (GB) ................................. 9901144

(51) Int. Cl.⁷ ................................................ E05D 7/12
(52) U.S. Cl. ............................ 16/254; 16/260; 16/262; 312/249.7
(58) Field of Search ....................... 16/254, 262, 272, 16/382, 268, 260, 261; 403/13, 353; 312/249.7, 323–325; 174/50, 52.4, 54, 97, 101

(56) References Cited

U.S. PATENT DOCUMENTS

| | | | | |
|---|---|---|---|---|
| 1,186,637 A | * | 6/1916 | Williams | 16/272 |
| 2,058,341 A | * | 10/1936 | Mink | 16/265 |
| 3,017,217 A | * | 1/1962 | Keating | 296/97.13 |
| 3,564,978 A | * | 2/1971 | Flitz | 92/187 |
| 4,827,568 A | * | 5/1989 | Ramsauer | 16/266 |
| 4,937,916 A | * | 7/1990 | Redman | 16/243 |
| 4,942,271 A | * | 7/1990 | Corsi et al. | 174/101 |
| 5,561,886 A | * | 10/1996 | Flamme | 16/265 |
| 5,588,182 A | * | 12/1996 | Brownlie et al. | 16/268 |
| 5,826,305 A | * | 10/1998 | Domenig et al. | 16/235 |
| 6,158,087 A | * | 12/2000 | Cheung | 16/262 |
| 6,314,616 B1 | * | 11/2001 | King | 16/382 |
| 6,336,675 B1 | * | 1/2002 | Bruckner | 296/146.5 |
| 6,430,778 B1 | * | 8/2002 | King | 16/382 |

FOREIGN PATENT DOCUMENTS

| | | | |
|---|---|---|---|
| DE | 23 22 258 A | 11/1973 | |
| DE | 3605434 A1 * | 8/1987 | ............ E05D/5/02 |
| DE | 197 08 061 A | 10/1997 | |
| EP | 0 197 755 | 10/1986 | |
| GB | 2259946 A * | 3/1993 | ............ E05D/5/02 |

* cited by examiner

*Primary Examiner*—Robert J. Sandy
*Assistant Examiner*—Andre' L. Jackson
(74) *Attorney, Agent, or Firm*—Quarles & Brady LLP

(57) ABSTRACT

A spacing member (15) on a hinge arm (1) bears against guide surfaces (22, 231) and locates a hinge pin (16) generally beneath a hinge pin hole in a recess (2) to be mounted on a door to be hingedly mounted on a cabinet which has a frame mounting the hinge arm. Lowering of the recess when so generally located cause a chamfer (161) on the end of the hinge pin (16) to accurately align the hinge pin with the hinge pin hole as the hinge pin (16) enters the hinge pin hole to move the spacing member (15) out of engagement with the guide surfaces (22, 231).

10 Claims, 4 Drawing Sheets

HINGE CONNECTION

This invention relates to a hinge connection particularly but not exclusively suited for forming a hinge connection between a frame of an electrical cabinet and a removable door panel thereof.

Electrical cabinets generally comprise a frame for receiving sub-racks of electrical and electronic components, and other items such as cooling fans. The frame is clad in side panels and an operable door panel. These panels are usually removable in order to facilitate the fitting of the components to the frame during initial manufacture, and also to facilitate in-use servicing of the components. The cabinet can be quite tall (typically 2 meters) and therefore the removable door panel can be quite bulky and also quite heavy, and is accordingly sometimes difficult for a person to position accurately when trying to fit the door panel onto the frame by aligning the hinge pins of the frame with hinge holes formed in the door panel.

According to a first aspect of the present invention, there is provided a hinge connection comprising:

a hinge arm at the end of which is a hinge pin; and a hinge recess having a corner for guiding the hinge arm to a first position at which the hinge arm is seated in the corner and from which the hinge arm is slidable relative to the hinge recess along the corner to a second position to insert the hinge pin into a hinge hole of the recess whilst unseating the hinge arm from the corner, the end of the pin being chambered such that, during the movement from the first position to the second position, the chamfer guides the hinge arm out of seated engagement with the corner of the recess.

Because the corner of the hinge recess guides the hinge arm to the first position, it becomes easier to fit a door panel incorporating the hinge recess onto a cabinet frame incorporating the hinge arm. Usually, the operator needs only to achieve general approximate alignment of the hinge arm with the hinge recess, before pressing the door panel with the hinge recess onto the hinge arm to achieve the necessary correct alignment represented by the first position. The operator may then release the weight of the door panel and the weight of the door panel will cause it to drop downwards, producing movement from the first position to the second position at which the hinge pin is correctly received in the hinge hole. During this movement, the hinge arm that was previously seated in the corner is unseated therefrom, so that during use of the hinge there will be no unwanted frictional rubbing of the hinge arm on the corner of the hinge recess. Thus, the seating function of the hinge arm in the recess is provided only when it is needed (during assembly of the hinge connection) and is dispensed with when it is no longer needed (during subsequent use of the hinge connection).

The degree of the chambering of the pin can be matched to the amount of unseating of the hinge arm from the corner that is required.

Whilst in some embodiments the hinge pin itself may be the component of the co hinge arm which seats in the corner of the hinge recess, it is preferred that the hinge arm has a spacing member which:

protrudes radially beyond the hinge pin;

in the first position is in seated engagement with the corner of the recess whilst spacing the hinge pin away from the corner; and in the second position is no longer in seated engagement with the corner.

In many embodiments, the spacing member has a cylindrically curved surface. This surface may be only partially annular, but in many embodiments it may be a complete annulus such that the spacing member has a spacing surface which is circumferentially a complete cylinder.

In some embodiments, the hinge pin will be freely rotatable in a main arm portion of the hinge arm. In other embodiments, the spacing member is integral with the hinge pin and these components are rotatably mounted at the end of a main arm portion of the hinge arm.

According to a further aspect of the present invention, there is also provided an electrical cabinet for electronic and electrical components, comprising a hinge connection as described above and a frame having a frame member at the end of which is the hinge arm and a removable door panel including the hinge recess.

A non-limiting embodiment of the present invention will now be described, by way of example only, with reference to the accompanying drawings, in which.

Figure 1:
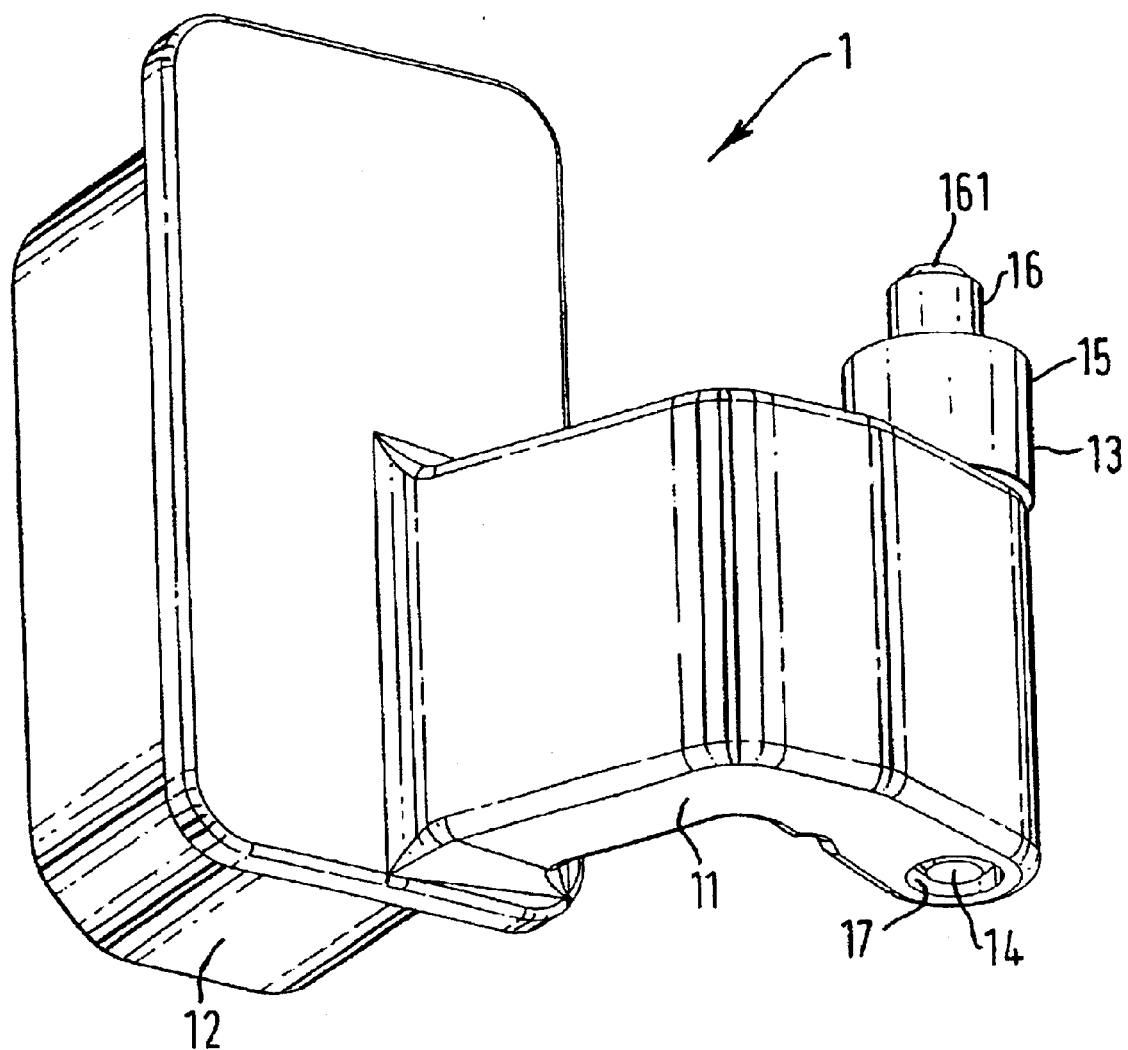
FIG. 1 is a perspective view of a hinge arm of a hinge connection in accordance with the present invention.
Figure 2:
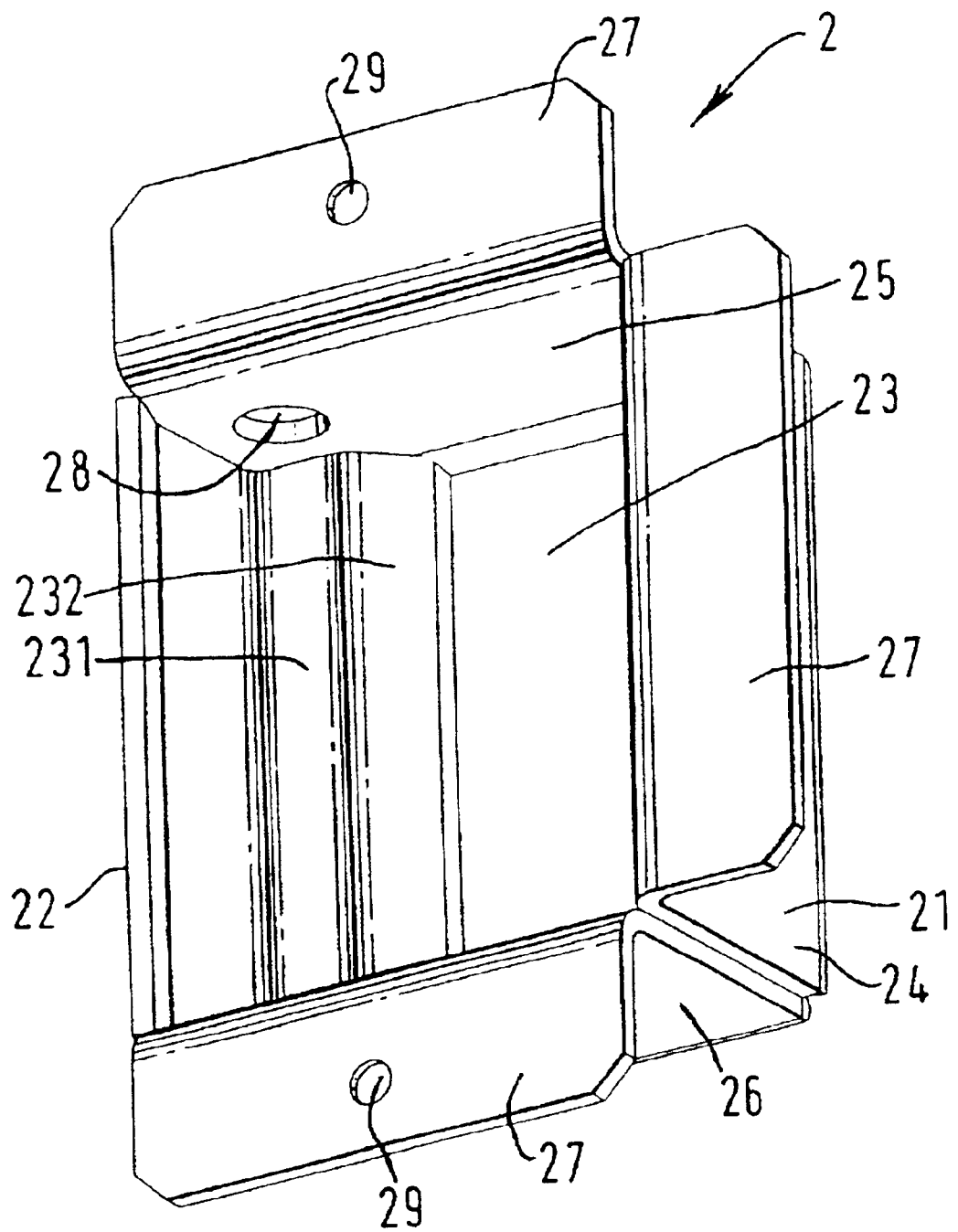
FIG. 2 is a perspective view of a hinge recess of the hinge connection.

The hinge connection comprises a hinge arm 1 shown in FIG. 1 and a hinge recess 2 shown in FIG. 2 which functions as a socket for receiving the hinge arm 1

The hinge arm 1 comprises a main arm portion 11 which projects from a base 12 shaped for functioning as an end cap for insertion into the end of a structural frame member of a frame of an electrical cabinet. The main arm portion 11 is curved and at its free end it rotatably carries a pin assembly 13 comprising a shaft 14, a collar 15 and a pin 16. The shaft 14 is rotatably received in a vertical through hole 17 at the free end of the main arm portion 11. The collar rests on the top surface of the main arm portion 11.

The shaft 14, collar 15 and pin 16 are integral with one another so that the pin assembly 13 rotates as a single unit.

The hinge recess 2 comprises a box-like body 21 having three main side walls 22, 23 and 24. There are also top and bottom walls 25, 26. Flanges 27 are folded outwardly from the walls 24, 25 and 26. The three flanges 27 lie in a common plane and two of them have apertures 29 to enable the hinge recess 2 to be fitted to a removable door panel.

A portion 231 of the side wall 23 is higher than the rest of the base of the body and is linked to the main part of the side wall 23 by a sloping connecting portion 232 of the side wall 23.

A hinge hole 28 is provided in the top wall 25.

During insertion of the hinge arm into the hinge recess, the operator needs to aim the hinge arm only generally towards the corner containing the hinge hole 28 because if, as viewed in FIG. 2, the hinge arm 1 is too far over to the left the collar 15 will impact on the inner face of the side wall 22 and be deflected towards the right to end up at a first position at which the pin 16 is generally aligned under the hole 28.

If the hinge arm enters the hinge recess too far over to the right, as viewed in FIG. 2, the collar 15 will impact on the side wall portion 231 and be deflected or guided slightly leftwards so that by the time the collar 15 reaches the bottom of the groove defined by the side wall 22 and side wall portion 231, the pin 16 will be correctly generally aligned under the hinge hole 28.

The inner face of the side wall 22 and the inner face of the side wall portion 231 are generally elongate planar surfaces that are orthogonal to one another so as to define the groove into which the collar 15 is seated when the hinge arm reaches a first position in the hinge recess. In this first position, the pin 16 is spaced away from the hinge recess 2.

Relative movement is then produced between the hinge arm 1 and hinge recess 2 such that the collar slides along the base of the groove in which it is seated, to start to insert the pin 16 in the hinge hole 28. In the first position, the longitudinal axis of the pin 16 is slightly lower down in the groove than the axis of the hinge hole 28. Consequently, a chambered leading edge 161 of the pin 16 is used to lift the pin 16 slightly up in the groove and into correct alignment with the axis of the hinge hole 28 as the pin proceeds fully into the hole as the hinge arm reaches its second, final position. Because of the lifting action of the leading edge 161, the collar 15 is unseated from the groove defined by the side wall 22 and side wall portion 231. This is so that, in use, there is no unwanted frictional rubbing of the hinge recess 2 against the cylindrical side surface of the collar 15.

In the second, final position achieved at the end of the assembly operation, the top wall rests on the top end surface of the collar 15 which thereby acts as a shoulder.

It may be seen that the collar 15 acts a spacing member in the first position, for spacing the pin 16 away from the guide surfaces of the groove in the corner of the hinge recess 2, whilst generally correctly positioning the pin 16 under the hole 28 ready for its insertion into that hole upon movement from the first position to the second position.

The side wall 22, side wall portion 231 and top wall 25 are mutually orthogonal. This is the preferred arrangement. In an alternative, the internal angle between the side wall 22 and side wall portion 231 could be greater or less than 90° as long as the function is achieved of correctly guiding the hinge arm to its first, seated position in the corner of the hinge recess under the hinge hole 28.

Figure 3:
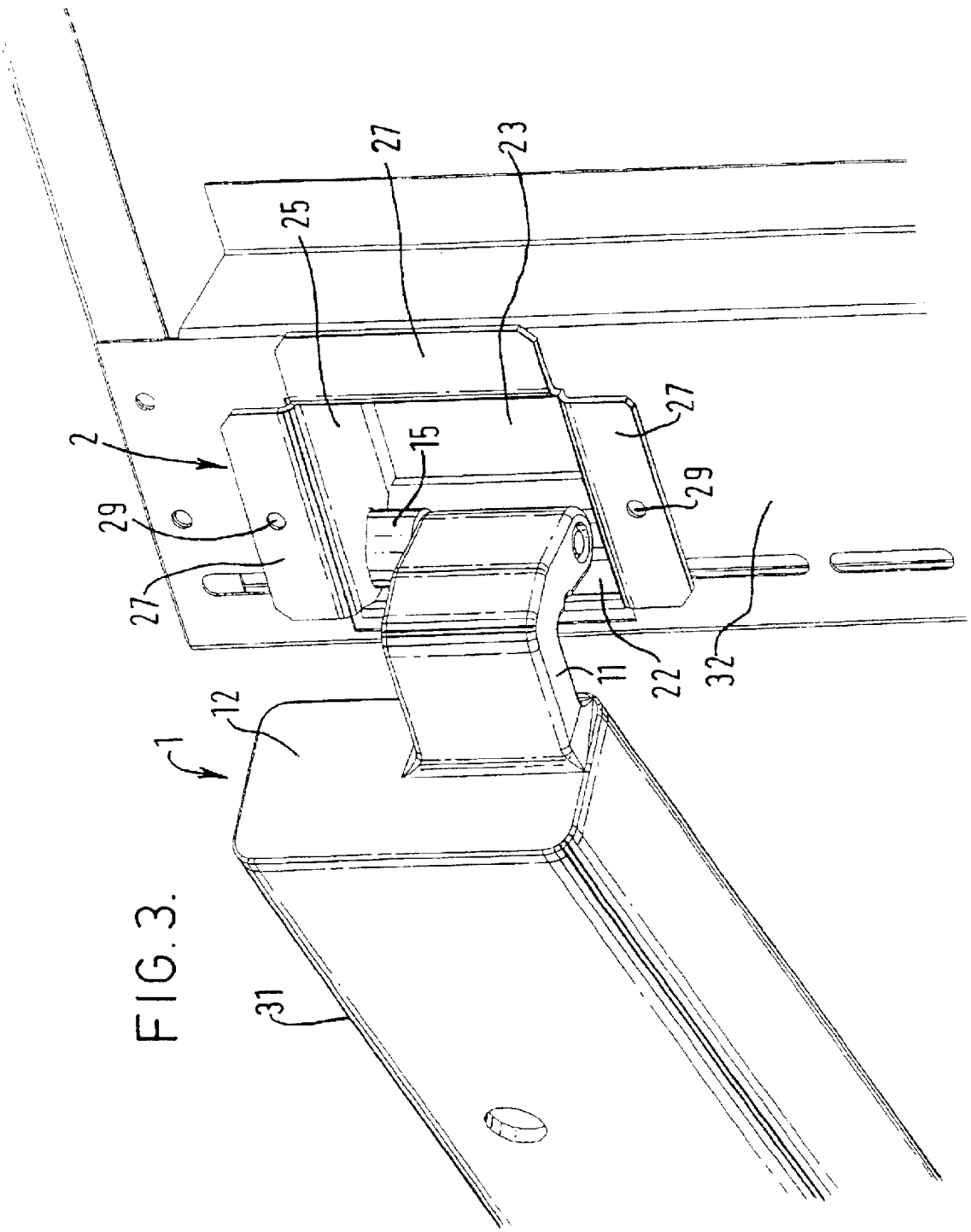
FIG. 3 is a perspective view of the hinge connection when in use, with the hinge arm fitted to a frame of an electrical cabinet and the hinge recess fitted to a removable door panel of the electrical cabinet.
Figure 4:
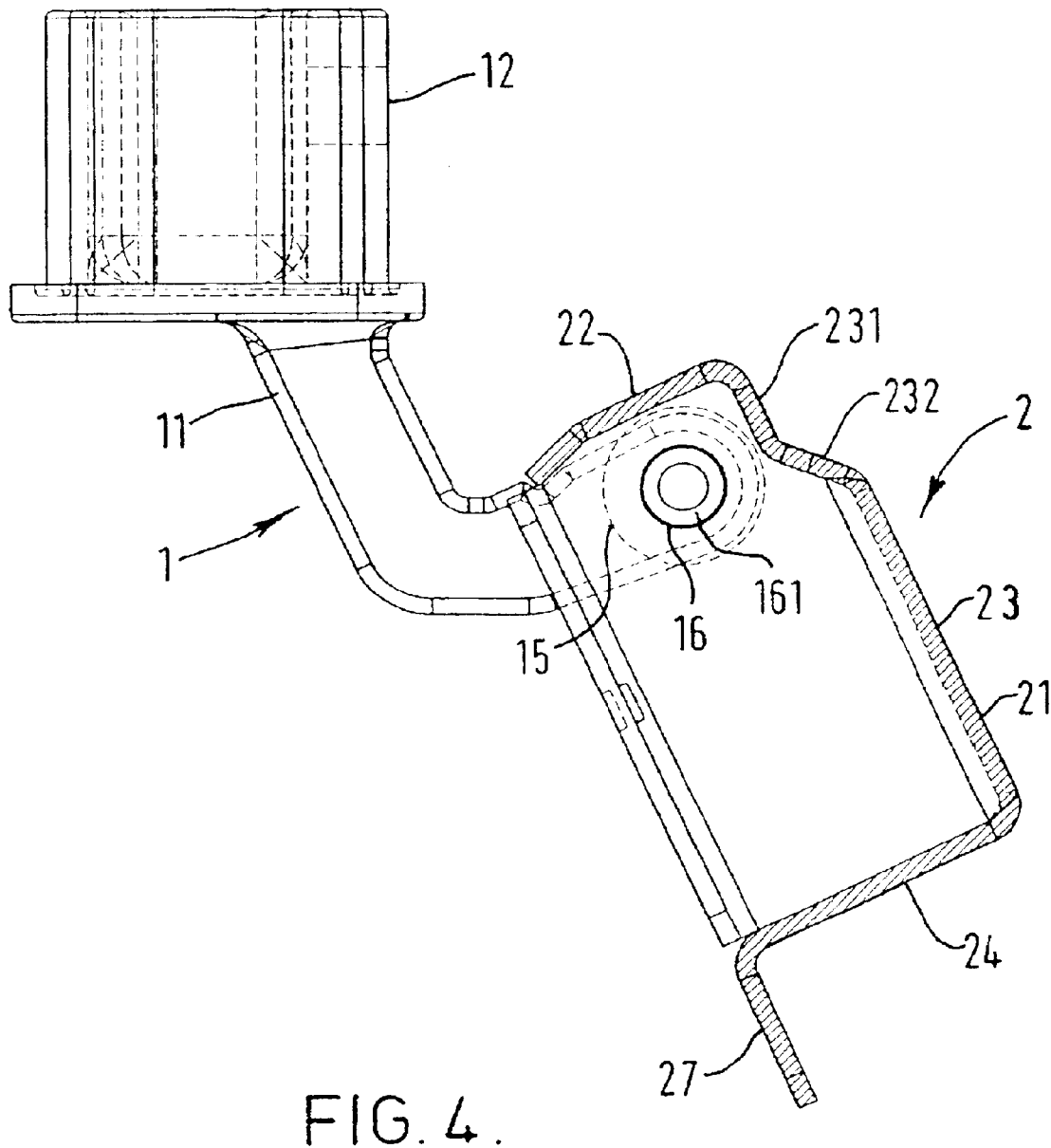
FIG. 4 is a plan view of the assembled hinge connection, showing the slight unseating that occurs in the second position.

FIG. 3 shows how the hinge connection of the present embodiment may be used. The base 12 is inserted into the end of a structural frame member 31 of the frame of an electrical cabinet. The hinge recess 2 is inserted into a side strengthening member 32 of a removable door panel of the electrical cabinet. Thus, in use, the hinge arm 1 will be static and it is the hinge recess 2 which moves relative to the hinge arm 1. Therefore, when moving to the first position, the operator looks to ensure that a pushing motion will generally insert the pin assembly 13 into the corner of the hinge recess under the hinge hole 28. Precise alignment is not required before the pushing operation commences, because the collar 15 will be guided by the side wall 22 and side wall portion 231 to the correct position. Then, the operator can release the weight of the door panel and produce the relative sliding movement from the first position to the second, final position at which the pin 16 is fully received in the hinge hole 28 and the collar 15 has lifted slightly clear from being seated in the corner of the hinge recess.

What is claimed is:

1. An electrical cabinet for electronic and electrical components, comprising:

a frame;

a hinge arm extending from the frame, the hinge arm having a hinge pin at an end thereof;

a removable door including a hinge recess, the hinge recess having an end surface and a hinge hole disposed in the end surface for receiving the hinge pin and having guide surfaces forming a corner for guiding the hinge arm to a first position at which the hinge arm is seated in the corner and from which the hinge arm is slidable relative to the hinge recess along the corner towards a second position in which second position the hinge pin is inserted in the hinge hole while unseating the hinge arm from the corner; and wherein the end of the hinge pin has a chamfer and the hinge hole is disposed in the end surface at an end of the corner and is arranged relative to the corner such that, during movement from the first position to the second position, the chamfer guides the hinge arm out of seated engagement with the corner of the recess.

2. The electrical cabinet as defined in claim 1, wherein the hinge arm includes a spacing member which:

protrudes radially beyond the hinge pin;

in the first position, is in seated engagement with the corner of the recess; and in the second position, is no longer in seated engagement with the corner.

3. An electrical cabinet according to claim 2, wherein the spacing member has a cylindrically curved surface.

4. An electrical cabinet according to claim 2, wherein the spacing member is contiguous with the hinge pin.

5. The electrical cabinet as defined in claim 2, wherein the spacing member is contiguous with the hinge pin.

6. An electrical cabinet according to claim 2, wherein the spacing member has a surface which is circumferentially a complete cylinder.

7. An electrical cabinet according to claim 6, wherein the hinge arm includes a main arm portion, and the spacing member and the hinge pin are integrally formed and rotatably mounted at an end of the main arm portion.

8. An electrical cabinet according to claim 1, wherein the guide surfaces are planar.

9. An electrical cabinet according to claim 8, wherein the guide surfaces are generally orthogonal.

10. An electrical cabinet according to claim 9, wherein the end surface is orthogonal to the guide surfaces.

* * * * *

UNITED STATES PATENT AND TRADEMARK OFFICE
CERTIFICATE OF CORRECTION

PATENT NO. : 6,810,562 B1  Page 1 of 1
APPLICATION NO. : 09/889685
DATED : November 2, 2004
INVENTOR(S) : David Horne et al.

It is certified that error appears in the above-identified patent and that said Letters Patent is hereby corrected as shown below:

Column 1, Line 10:

"operable" should be --openable--.

Column 1, Line 57:

"co" should be deleted.

Column 2, Line 38:

Add --15-- between "The collar . . ." and "rests on . . .".

Column 3, Line 8:

Add --15-- between "The collar . . ." and "slides along . . .".

Column 3, Line 23:

Add --25-- between ". . . top wall . . ." and ". . . rests on the top . . .".

Signed and Sealed this

Third Day of April, 2007

JON W. DUDAS
*Director of the United States Patent and Trademark Office*